United States Patent [19]

Boland

[11] Patent Number: 5,524,350
[45] Date of Patent: Jun. 11, 1996

[54] CUTTING LINE FILLED WITH INORGANIC GRIT MATERIAL

[75] Inventor: Harvey E. Boland, Prosperity, S.C.

[73] Assignee: Glassmaster Company, Lexington, S.C.

[21] Appl. No.: 275,879

[22] Filed: Jul. 15, 1994

[51] Int. Cl.⁶ .................................................. B26B 7/00
[52] U.S. Cl. .................... 30/347; 30/166.3; 30/276; 56/12.7; 76/101.1
[58] Field of Search .................... 30/166.3, 276, 30/347; 56/12.7, 295; 76/115, 101.1; 428/368, 395, 396

[56] References Cited

U.S. PATENT DOCUMENTS

| | | | |
|---|---|---|---|
| 4,054,993 | 10/1977 | Kamp et al. | 30/276 |
| 4,068,376 | 1/1978 | Briar | 30/276 |
| 4,302,878 | 12/1981 | Bonforte | 30/347 |
| 4,607,431 | 8/1986 | Gay | 30/276 |
| 5,335,488 | 8/1994 | Honigsbaum | 30/166.3 |

*Primary Examiner*—Douglas D. Watts
*Attorney, Agent, or Firm*—Rhodes Coats & Bennett

[57] ABSTRACT

A cutting line for grass trimmers, lawn mowers, and edgers of the type having a rotating head. The cutting line includes a carrier formed from a polymeric material and an inorganic grit material impregnated within the carrier. Preferably, the grit material makes up between about 6–15% by weight of the cutting line and has an average size of between about 120 to 240 mesh. The grit material may be silicon carbide, aluminum oxide, or silica. The polymeric material is preferably nylon. The carrier may also include a coupling agent and/or a heat stabilizer.

11 Claims, 4 Drawing Sheets

CUTTING LINE FILLED WITH INORGANIC GRIT MATERIAL

FIELD OF THE INVENTION

The present invention relates to a cutting line for use with rotating grass trimmers, lawn mowers, and edgers, and, more particularly, to such a cutting line filled with abrasives of silicon carbide, aluminum oxide, sand, or other inorganic filling material.

BACKGROUND OF THE INVENTION

Rotating grass trimmers, lawn mowers, and edgers are commonly used for cutting grass and other foliage in places which are difficult or inconvenient to access using other types of lawn mower equipment. Such trimmers typically include a rotating head from which a cutting line is radially dispensed. Preferably, the line is flexible to increase the safety of the trimmer. As the head is rotated, the resulting centrifugal force causes the line to extend substantially straight out from the head. The line, being rotated at high speeds with particularly high velocity toward the end of the line distal from the head, serves as a cutting surface similar to a blade. In most applications, the last one-half inch of the line does substantially all of the cutting.

Typically, cutting line as described above is designed to be both safe and disposable. For this reason, it is often made from a flexible and inexpensive material such as nylon. However, polymers such as nylon are not good cutting materials and have a tendency to split at the cutting end. When the cutting end splits, the density of the cutting edge is reduced, thereby reducing the effectiveness of the line in cutting grass.

Furthermore, it is advantageous to increase the density of the flexible cutting line to improve the shear force of the line. Metal cutting lines have been used for this purpose but result in a cutting line which is less safe to use. Varying cutting line cross-sectional shapes have been implemented, but such designs add to the cost of manufacture.

U.S. Pat. No. 4,607,431 to Gay suggests that a filament loaded with abrasive particles may be used with the foliage trimmer disclosed therein. However, Gay in no way discloses or suggests a more specific composition or method of manufacture. Further, Gay does not suggest that a filament loaded with abrasive particles would have any beneficial characteristics over a non-loaded filament.

Thus, there is a need for a cutting line construction having increased density. Further, there is a need for such a cutting line which has a reduced tendency for end splitting. There exists a need for a cutting line as described above which retains the safety and inexpensiveness of conventional, flexible cutting line.

SUMMARY OF THE INVENTION

The present invention is directed to a composite cutting line for grass trimmers, lawn mowers, and edgers of the type having a rotating head. The composite cutting line includes a nylon blend carrier which is impregnated from 1%–30% (preferably 6–15%) with an inorganic grit material. The grit material is preferably silicon carbide, aluminum oxide, silica (sand), or some other inorganic filling material. The filling material size ranges from 46–600 mesh (316 to 24 microns) with an average mesh size of between 120 and 240 (122 to 66 microns) being preferred. The cutting line is preferably from 0.030–0.500 inches in diameter and may be round, rectangular, square, star, triangular or oval in shape.

It is an object of the present invention to provide a cutting line for use with a rotating head-type grass trimmer, lawn mower, and/or edger which cuts more efficiently than conventional nylon cutting line while retaining the safety of such lines.

It is an object of the present invention to provide a cutting line as described above having increased density, thereby providing increased shear force.

It is an object of the present invention to provide a cutting line as described above with a reduced tendency to split at its free end.

It is an object of the present invention to provide a novel line for a rotating grass cutter with much improved cutting and wear performance characteristics while maintaining the safety factor of flexible cutting lines.

It is an object of the present invention to provide a line which is inexpensively produced but maintains significantly better cutting and wear characteristics than conventional cutting lines.

Another object of the present invention is to provide a cutting line which not only has the capability of producing significantly improved cutting and wear characteristics, but can be used in present cutting line devices with no modifications.

It is an object of the present invention to provide such a cutting line which cuts more efficiently and thereby reduces the load on the cutting motor.

It is an object of the present invention to provide a cutting line which improves the cutting performance of a flexible line for any shape.

Other advantages and objects of the present invention will become apparent from the description of a preferred embodiment which follows.

DETAILED DESCRIPTION OF THE INVENTION

The cutting line of the present invention comprises generally a flexible carrier which is impregnated with an inorganic, abrasive grit material. The cutting line of the present invention provides superior cutting ability, efficiency, impact strength, durability, toughness, wear characteristics, and shear force compared to conventional, flexible cutting lines, while maintaining the safety factor of such lines.

The cutting line of the present invention is designed for use in grass trimmers, lawn mowers, mulching attachments, edgers and the like. The apparatus will typically include a rotating head in which coiled cutting line is stored. The rotating head has an eyelet or hole positioned along its circumference from which a length of line extends. Because the line is subject to wear and breakage, the rotating head is usually provided with means for dispensing additional lengths of cutting line. As the rotating head spins, the resulting centrifugal force causes the dispensed portion of the line to extend radially outward from the rotating head, the free end of the line defining a perimeter. Vegetation brought into the path of this perimeter is sheared by the cutting line which travels at high speed. In many applications, such as grass trimmers, the last one-half inch of the line does substantially all of the cutting.

Figure 1:
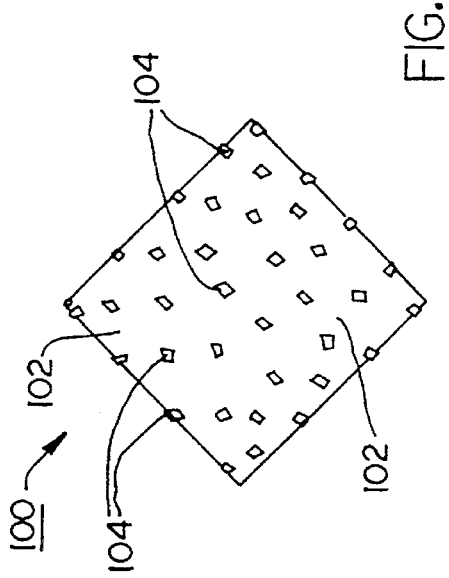
FIG. 1 is a cross-sectional view of the cutting line of the present invention.
Figure 2:
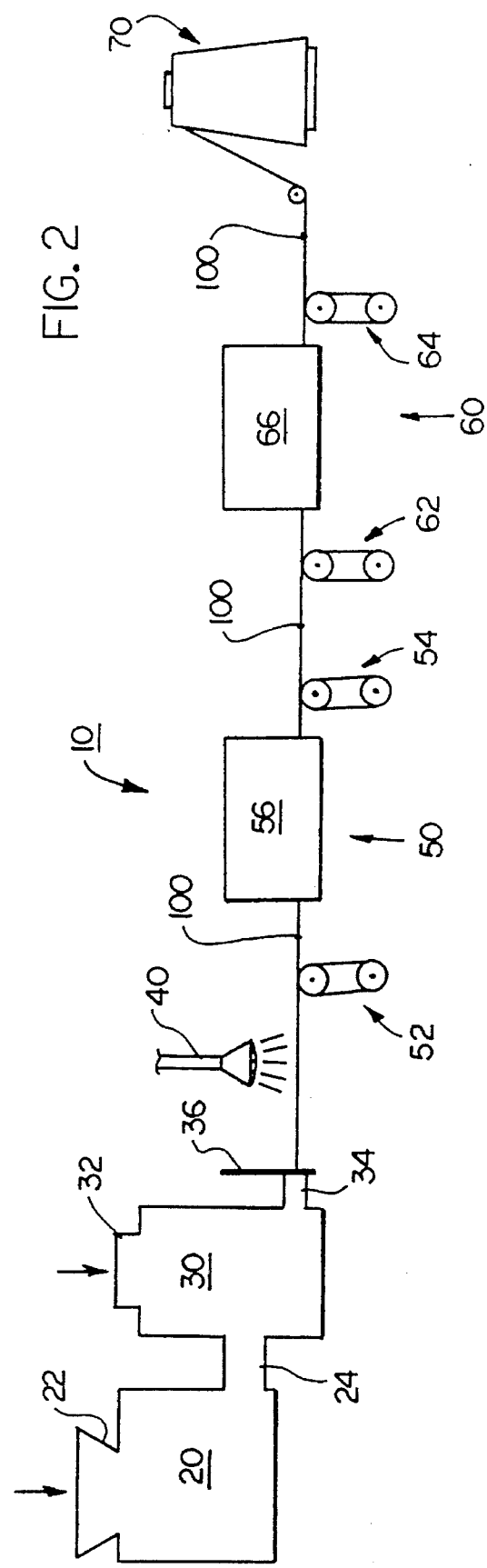
FIG. 2 is a schematic diagram of an apparatus for forming a cutting line of the present invention according to a method of the present invention.

In the cutting line of the present invention, as best seen in FIG. 1 and generally denoted by the numeral 100, the carrier or matrix 102 may be formed from any suitable flexible polymeric material. Preferably, the carrier 102 is manufactured from polymeric materials such as Nylon 6, Nylon 6-12, Nylon 6-10, Nylon 6-6/9, Nylon 8, or any copolymers or blends of the above nylons. Polyethylene, polypropylene, polyester PET type, or any other variations of polyamides may be used as well. It is important that the material chosen for the carrier 102 be flexible so as to provide a safe line while also providing a suitable matrix for supporting the grit material 104 hereinafter described in more detail.

The following resin formulation has been found to provide superior toughness and durability:

TABLE 1

| Material | Weight Percentage | Example |
| --- | --- | --- |
| Nylon 6-6/6 Copolymer | 40% | Allied Signal Product D1738 |
| Nylon 6-6/9 Copolymer | 35% | Ny Coa Product 2046 |
| Nylon 6 | 25% | Allied Signal Product 8219 |
| Heat Stabilizer | 0.1% | Allied Signal Product H11 |

The exact formulation may be altered to provide for varying characteristics as required by a particular application. The heat stabilizer serves to preserve the nylon at high operating temperatures, particularly at the free end of the line. Further, a coupling agent such as anhydride or silene may be added at about 1% by weight to better secure the grit material to the nylon blend carrier. The grit 104 material is an inorganic material, preferably silicon carbide, aluminum oxide, or silica. The grit material provides the line with greater density and abrasiveness which in turn provides greater longevity and shear force to the spinning cutting line. Further, the grit material itself provides relatively sharp edges which help shear the vegetation, thereby making cleaner and more efficient cuts. The grit 104, particularly when used with a carrier formed from the above-described resin formulation, helps to keep the end of the cutting line from splitting, thereby maintaining the integrity and density of the line at its primary cutting portion.

With the aforementioned objectives in mind, it has been determined that grit in an amount from 1%–30% by weight provides a superior balance between line integrity and cutting ability. Higher concentrations of grit improve cutting ability but decrease line integrity. It has been found that concentrations above 30% by weight lack the desired resistance to break off. On the other hand, if the concentration of grit is too low, the gain in cutting efficiency becomes negligible. Preferably, the grit makes up from 6%–15% by weight of the line with about 10% by weight being optimal for most applications.

The resulting cutting line has a flexural modulus in the range of 30,000 psi to 1,000,000 psi and a minimum tenacity of about 1.0 grams per denier.

The mesh size of the grit should be from 46–600 mesh (316 to 24 microns). Preferably, the mesh size is from 120–240 mesh (122 to 66 microns) with a mesh size of about 180 (82 microns) being optimal. It has been found that these ranges provide superior cut ability to the line without causing undue wear to the dispensing eyelet of the rotating head of the cutting apparatus.

The overall cutting line 100 preferably has a diameter of between 0.03" and 0.5". It has been found that diameters of less than 0.03" are too weak and provide low cutting ability. Diameters above 0.5" are difficult to manufacture and also have decreased cutting ability. The preferred diameter within the preferred range of diameters will depend on the intended use for the line.

The cutting line may be manufactured in any shape cross-section desired including round, rectangular, square (as shown in FIG. 1), star, triangular, and oval.

Cutting lines having compositions as detailed below were field tested to determine their cutting efficiency (wear/split) versus regular nylon cutting line. The relative cutting efficiency of regular nylon is 1.0. All densities are theoretical and are taken from *Elements of Natural Science and Engineering*, 3rd Ed. (1975). The density of the regular nylon is believed to be approximately 1.15 grams/cc. All of the cutting lines used in the examples had a cross-sectional diameter of approximately one-eighth inch.

Examples 1–9

Cutting lines filled with silica (sand) in the following proportions and having a nylon carrier as described above had the following cutting efficiencies. Volumetric percentages are calculated based on a density of 2.2 grams/cc for silica.

TABLE 2

| EXAMPLE | VOL. % SILICA | AVERAGE PARTICLE SIZE (MICRONS) | CUTTING EFFICIENCY (c.e.) |
| --- | --- | --- | --- |
| 1 | 0.5 | 316 | 1.2 |
| 2 | 0.5 | 82 | 1.3 |
| 3 | 0.5 | 24 | 1.1 |
| 4 | 7.5 | 316 | 1.6 |
| 5 | 7.5 | 82 | 1.8 |
| 6 | 7.5 | 24 | 1.5 |
| 7 | 15 | 316 | 1 |
| 8 | 15 | 82 | 1.2 |
| 9 | 15 | 24 | 0.9 |

Figure 3:
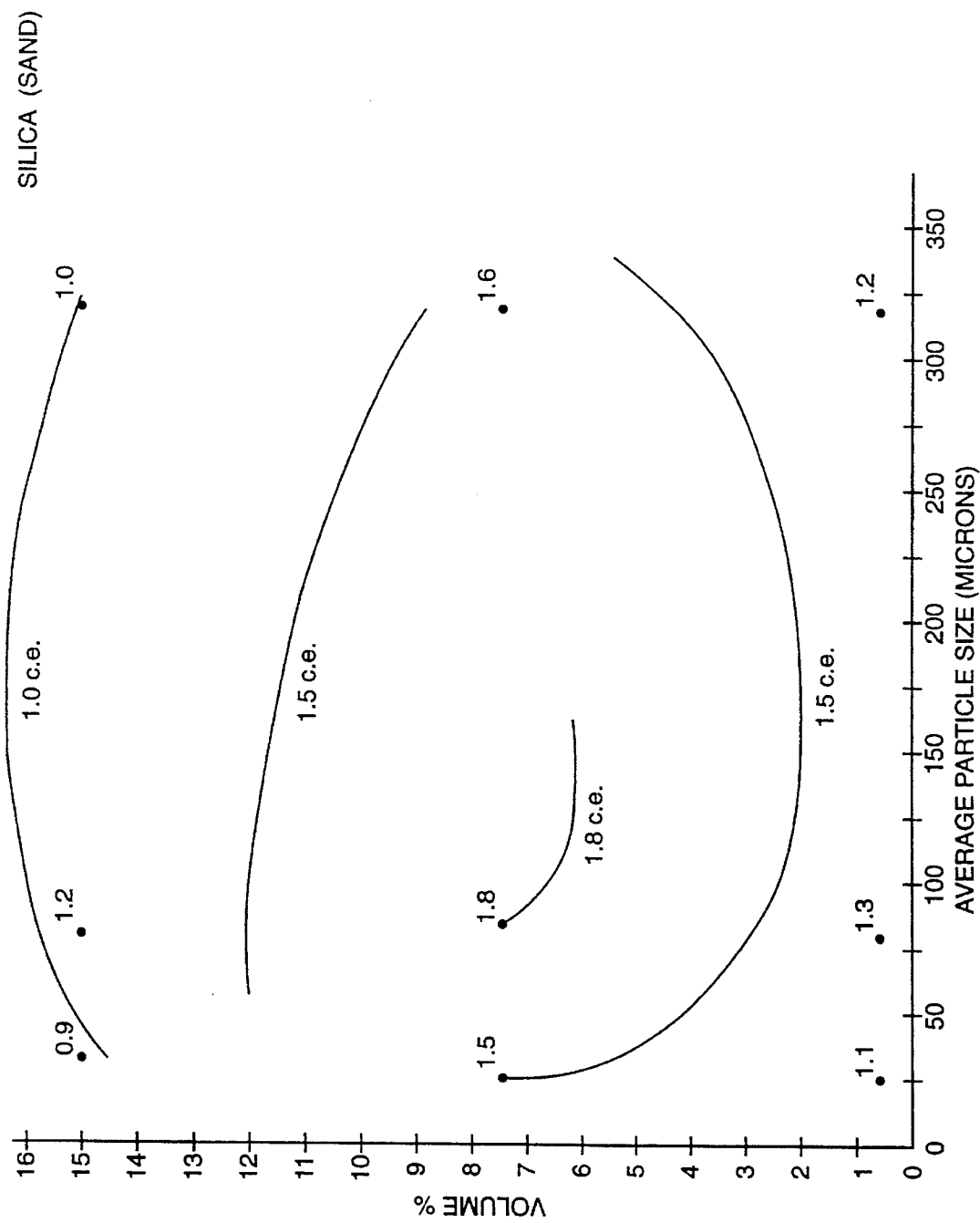
FIG. 3 is a graph showing the relative cutting efficiencies of different compositions of cutting lines according to the present invention using silica (sand).

This data is topographically plotted in FIG. 3. All of the curves are approximated, but the general trend of increased efficiencies for cutting lines having compositions as detailed above is clearly evident. The following third order expanded Taylor series equation has been derived from the above data and represents the relative cutting efficiency as a function of the volumetric percent (w) in % and average particle size (p) in microns.

$$f(w,p):=aw^3+bp^3+cw^3p^3+dw^2+ep^2+gw^2p^2+hw+ip+jwp+k$$

where:
25.0>w>0.0
400>p>20.0
a=0.95146083
b=−0.0034279060
c=3.8113280e-08
d=0.94016329
e=1.0782671
g=−0.00054518005
h=0.95522304
i=0.92923949
j=1.0144285
k=0.92230188

Example 10–18

Cutting lines filled with silicon carbide in the following proportions and having a nylon carrier as described above had the following cutting efficiencies. Volumetric percentages are calculated based on silicon carbide having a density of 3.17 grams/cc.

TABLE 3

| EXAMPLE | VOL. % SILICON CARBIDE | AVERAGE PARTICLE SIZE (MICRONS) | CUTTING EFFICIENCY (c.e.) |
|---|---|---|---|
| 10 | 0.4 | 316 | 1.4 |
| 11 | 0.4 | 83 | 1.5 |
| 12 | 0.4 | 24 | 1.3 |
| 13 | 5.4 | 316 | 1.8 |
| 14 | 5.4 | 82 | 2 |
| 15 | 5.4 | 24 | 1.7 |
| 16 | 10.9 | 316 | 1.2 |
| 17 | 10.9 | 82 | 1.5 |
| 18 | 10.9 | 24 | 0.9 |

Figure 4:
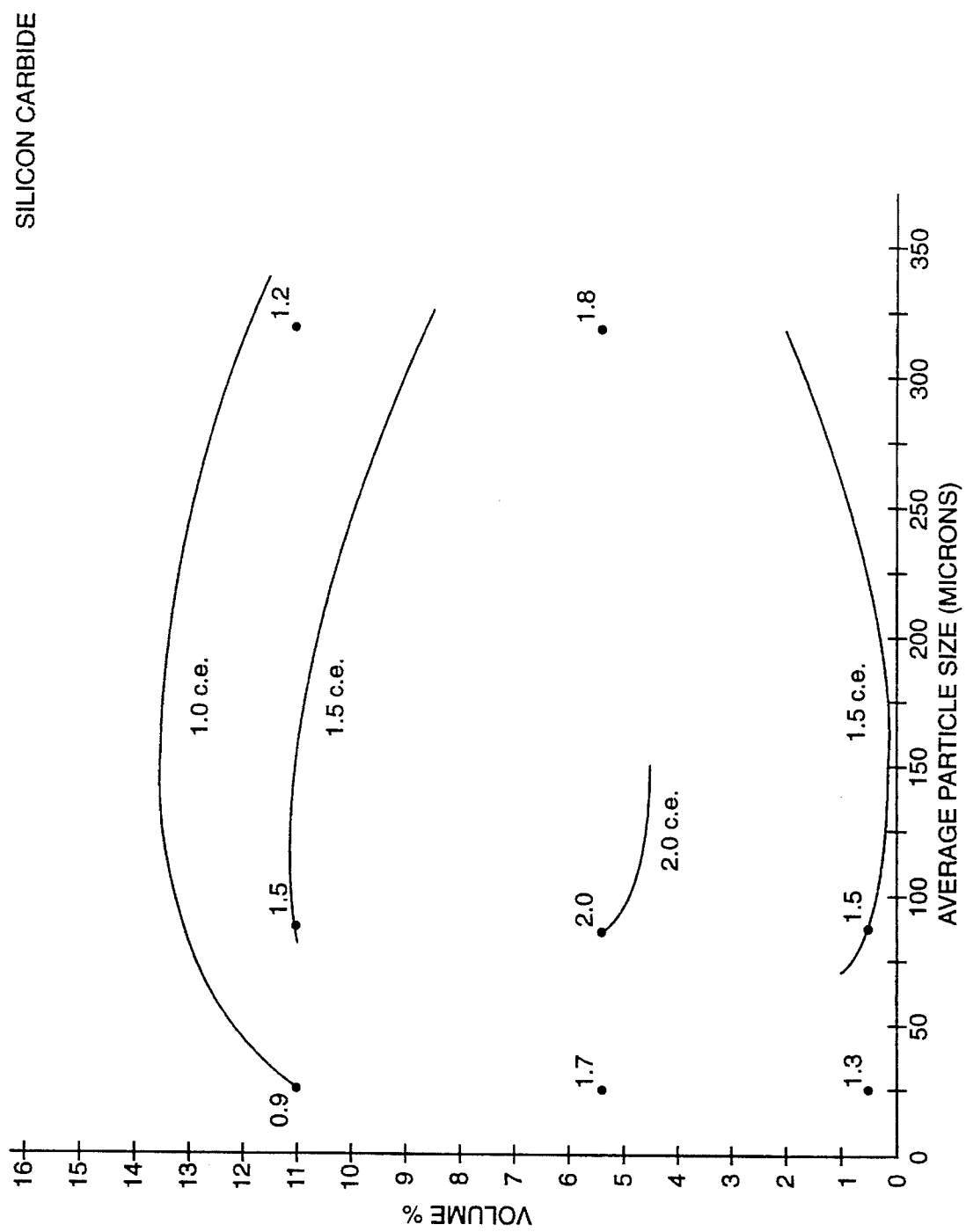
FIG. 4 is a graph showing the relative cutting efficiencies of different compositions of cutting lines according to the present invention using silicon carbide.

This data is topographically plotted in FIG. 4. Again, the curves have been approximated but clearly show a trend of increased cutting efficiencies for cutting lines having compositions as detailed above. The following third order expanded Taylor series equation has been derived from the above data and represents the relative cutting efficiency as a function of the volumetric percent (w) % and particle size (p) in microns.

$$f(w,p):=aw^3+bp^3+cw^3p^3+dw^2+ep^2+gw^2p^2+hw+ip+jwp+k$$

where:
25>w>0
400>p>20
a=0.95161841
b=− 0.0033371148
c=1.0989658e-06
d=0.94016102
e=1.0771728
g=−0.0043768123
h=0.95522101
i=0.92922208
j=1.0141747
k=0.92230145

Examples 19–27

Cutting lines filled with aluminum oxide in the following proportions and having a nylon carrier as described above had the following cutting efficiencies. Volumetric percentages are calculated based on aluminum oxide having a density of 3.8 grams/cc.

TABLE 4

| EXAMPLE | VOL. % ALUM. OXIDE | AVERAGE PARTICLE SIZE (MICRONS) | CUTTING EFFICIENCY (c.e.) |
|---|---|---|---|
| 19 | 0.3 | 316 | 1.3 |
| 20 | 0.3 | 82 | 1.4 |
| 21 | 0.3 | 24 | 1.2 |
| 22 | 4.5 | 316 | 1.7 |
| 23 | 4.5 | 82 | 1.9 |
| 24 | 4.5 | 24 | 1.5 |
| 25 | 9.1 | 316 | 1.1 |
| 26 | 9.1 | 82 | 1.4 |
| 27 | 9.1 | 24 | 1 |

Figure 5:
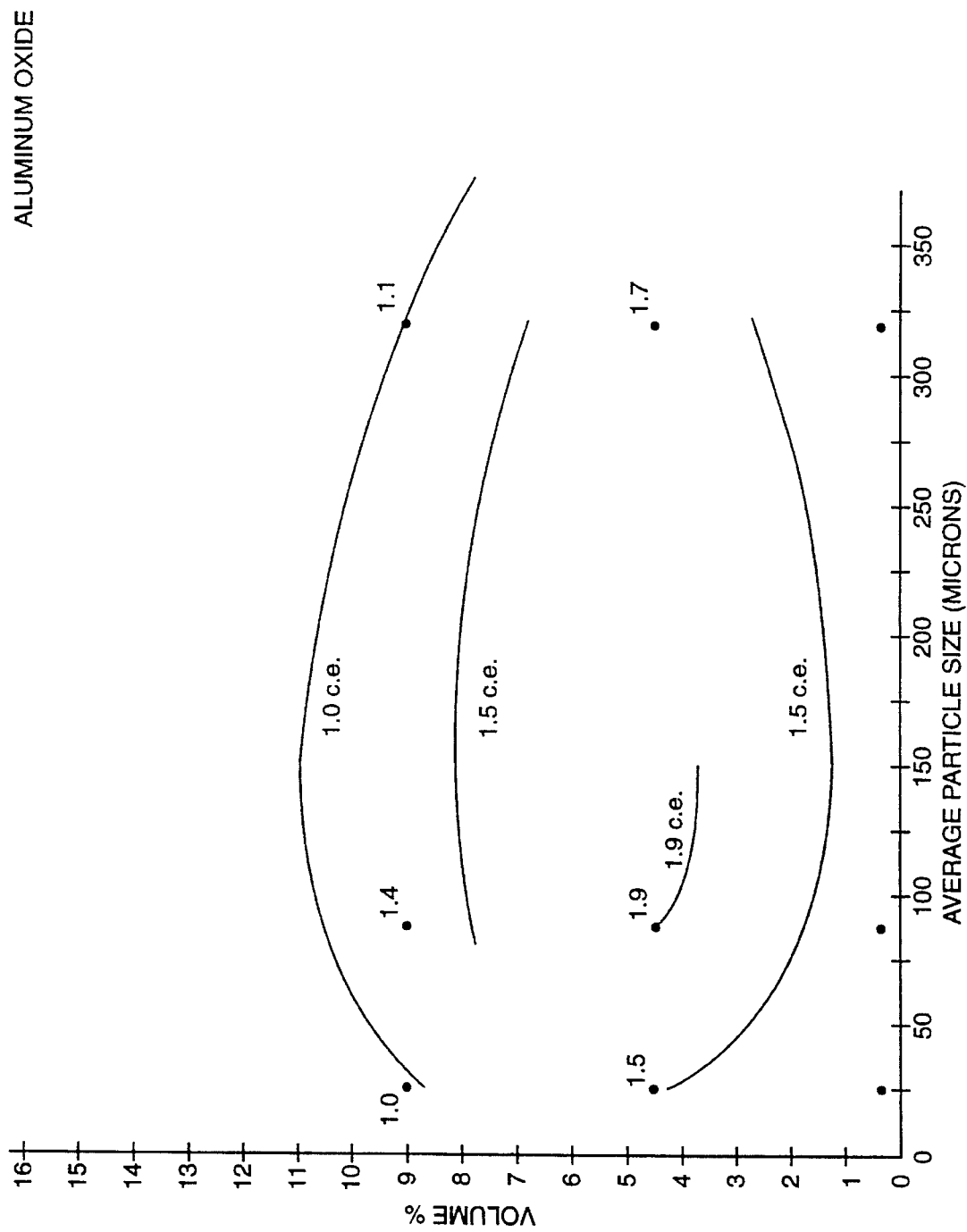
FIG. 5 is a graph showing the relative cutting efficiencies of different compositions of cutting lines according to the present invention using aluminum oxide.

This data is topographically plotted in FIG. 5. The curves are approximated but clearly show the benefits of cutting lines according to the present invention. The following third order expanded Taylor series equation has been derived from the above data and represents the relative cutting efficiency as a function of the volumetric percent (w) and average particle size (p).

$$f(w,p):=aw^3+bp^3+cw^3p^3+dw^2+ep^2+gw^2p^2+hw+ip+jwp+k$$

where:
15>w>0
500>p>20
a=0.75299394
b=−0.000078123681
c=8.8862470e-07
d=0.88394344
e=0.022645107
g=−0.0027164817
h=1.0823247
i=0.094049597
j=0.62156385
k=1.0140870

The cutting line of the present invention may be produced as detailed below and with reference to the drawing.

Nylon, preferably in the form of pellets and in the proportions detailed above is fed to a first heated extruder 20 through inlet 22. First extruder 20 melts and blends the nylon and expels the molten nylon through outlet 24 which feeds second heated extruder 30. Grit material is injected and mixed into the molten nylon in the proportions detailed above through inlet 32. The still-molten nylon blend, impregnated with the grit material, is then expelled through outlet 34. A spinnerette (i.e., a device for controlling the cross-sectional shape of the extruded material) is provided at outlet 34. The resulting nylon/grit cutting line 100 which exits the spinnerette is then quenched by water station 40. The cooled and hardened cutting line 100 is then run through drawing/orienting station 50 which includes roll stands 52, 54 and forced-air oven 56. The roll stands cooperate to place the line 100 in tension as it is passed through oven 50, thus stretching the line and orienting the molecules of the polymeric material therein. Thereafter, line 100 passes through relaxing station 60 which includes roll stands 62, 64 and forced-air oven 66. As line 100 passes through oven 66, it is warmed and allowed to relax. Finally, line 100 is rolled onto spool 70.

Certain modifications to the present invention will be apparent to those skilled in the art and are intended to be encompassed within the scope of the following claims. For example, other thermoplastic materials such as polypropylene or high density polyethylene may be used in place of nylon as the carrier.

I claim:

1. A cutting line, comprising:
   a) a carrier formed from a polymeric material;
   b) an inorganic grit material impregnated within said carrier; and
   c) wherein said grit material makes up about 10% by weight of said cutting line and said grit material is about 82 microns.

2. A cutting line, comprising:
   a) a carrier formed from a polymeric material;
   b) an inorganic grit material impregnated within said carrier;
   c) wherein said grit material makes up between about 1%–30% by weight of said cutting line; and
   d) wherein said polymeric material comprises a nylon blend selected from the group consisting of Nylon 6, Nylon 6-6/6, and Nylon 6-6/9.

3. The cutting line of claim 2 wherein said cutting line comprises by weight between about 20% to 30% of Nylon 6, between about 30% to 50% of Nylon 6-6/6 and between about 30% to 40% of Nylon 6-6/9.

4. A cutting line, comprising:
   a) a carrier formed from a polymeric material;
   b) an inorganic grit material impregnated within said carrier;
   c) wherein said grit material makes up between about 1%–30% by weight of said cutting line;
   d) wherein said polymeric material is nylon; and
   e) wherein said carrier includes a coupling agent to secure the grit material to the nylon.

5. The cutting line of claim 4 wherein said coupling agent is an anhydride.

6. A cutting line, comprising:
   a) a carrier formed from a polymeric material;
   b) an inorganic grit material impregnated within said carrier;
   c) wherein said grit material makes up between about 1%–30% by weight of said cutting line;
   d) wherein said polymeric material is nylon; and
   e) wherein said carrier includes a heat stabilizer to preserve the nylon at higher operating temperatures.

7. A cutting line, comprising:
   a) a carrier, said carrier including a nylon blend, said nylon blend comprising by weight between about 20% to 30% of Nylon 6, between about 30% to 50% of Nylon 6-6/6, and between about 30% to 40% of Nylon 6-6/9;
   b) an inorganic grit material impregnated in said carrier, said grit material selected from the group consisting of silicon carbide, aluminum oxide and silica; and
   c) wherein said grit material makes up between about 6%–15% by weight of said cutting line and has an average size between about 24 microns to 316 microns.

8. A cutting line comprising:
   a) a carrier, said carrier including a nylon blend;
   b) an inorganic grit material impregnated in said carrier, said grit material selected from the group consisting of silicon carbide, aluminum oxide and silica; and
   c) wherein said grit material makes up about 10% by weight of said cutting line and the average size of said grit material is about 82 microns.

9. A cutting line comprising:
   a) a carrier, said carrier including a nylon blend said nylon blend comprising a nylon material selected from the group consisting of Nylon 6, Nylon 6-6/6, and Nylon 6-6/9;
   b) an inorganic grit material impregnated in said carrier, said grit material selected from the group consisting of silicon carbide, aluminum oxide and silica; and
   c) wherein said grit material makes up between about 1%–30% by weight of said cutting line and has an average size between about 24 microns to 316 microns.

10. A method for forming a cutting line filled with inorganic grit material, comprising the steps of:
    a) melting a polymeric material;
    b) blending the molten polymeric material with the grit material;
    c) forming a line from the impregnated molten polymeric material and grit material;
    d) cooling the line; and
    e) stretching the line following the step of cooling the line.

11. The method for forming a cutting line of claim 10 further including the step of relaxing the line after the step of stretching the line.

* * * * *